(12) United States Patent
Skjoldborg et al.

(10) Patent No.: US 11,832,063 B2
(45) Date of Patent: Nov. 28, 2023

(54) SPEAKERPHONE HEARING DEVICE INTEGRATION

(71) Applicant: GN Audio A/S, Ballerup (DK)

(72) Inventors: Erling Skjoldborg, Ballerup (DK); Brian Dam Pedersen, Ballerup (DK); Leo Larsen, Ballerup (DK); Bo Schmidt, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 64 days.

(21) Appl. No.: 17/643,241

(22) Filed: Dec. 8, 2021

(65) Prior Publication Data

US 2022/0201408 A1   Jun. 23, 2022

(30) Foreign Application Priority Data

Dec. 23, 2020   (DK) .............................. PA202070874

(51) Int. Cl.
*H04R 25/00* (2006.01)
*H04L 9/40* (2022.01)

(52) U.S. Cl.
CPC ......... *H04R 25/554* (2013.01); *H04L 63/061* (2013.01); *H04R 25/70* (2013.01); *H04R 2225/55* (2013.01)

(58) Field of Classification Search
CPC ............. H04L 63/061; H04L 2209/805; H04L 9/0827; H04L 9/083; H04L 9/0861;
(Continued)

(56) References Cited

U.S. PATENT DOCUMENTS

| 10,945,082 B2* | 3/2021 | Solum .................. H04R 25/505 |
| 2003/0165239 A1 | 9/2003 | Bantz et al. |
| 2016/0173278 A1 | 6/2016 | Pedersen et al. |

FOREIGN PATENT DOCUMENTS

| EP | 3319338 A1 | 5/2018 |
| EP | 3334187 A1 | 6/2018 |

(Continued)

OTHER PUBLICATIONS

Extended European Search Report issued in corresponding European Application No. 21213235.1, dated May 23, 2022, 7 pages.
(Continued)

*Primary Examiner* — Brian Ensey
(74) *Attorney, Agent, or Firm* — HAMRE, SCHUMANN, MUELLER & LARSON, P.C.

(57) ABSTRACT

An electronic device is configured for facilitating call communication with at least one hearing device is provided, Additionally, a method for call communication with at least one hearing device, and a hearing device is provided. The electronic device comprises a first interface for interconnecting with a call communication software, e.g. via a call protocol, and an interacting unit configured for interacting with the hearing device. The interacting unit is configured for obtaining an audio encryption key and transmitting/presenting the audio encryption key to the hearing device. The electronic device further comprises a transmission unit configured for broadcasting encrypted audio during a call facilitated by the call communication software, the audio being encrypted using the audio encryption key. The audio encryption key may be configured to be valid for a duration of the call.

15 Claims, 6 Drawing Sheets

(58) Field of Classification Search
CPC .......... H04L 9/088; H04L 9/14; H04L 65/80; H04R 25/554; H04R 25/70; H04R 2225/55; H04R 2225/552
See application file for complete search history.

(56) References Cited

FOREIGN PATENT DOCUMENTS

| | | |
|---|---|---|
| EP | 3720080 A1 | 10/2020 |
| WO | 2008129546 A2 | 10/2008 |
| WO | 2014086388 A1 | 6/2014 |
| WO | 2016096011 A1 | 6/2016 |

OTHER PUBLICATIONS

Office Action issued in corresponding Danish Application No. PA 2020 70874, dated Jun. 22, 2021.

\* cited by examiner

SPEAKERPHONE HEARING DEVICE INTEGRATION

TECHNICAL FIELD

The present disclosure relates to communicating with a hearing device, particularly to an electronic device configured to communicating with a hearing device; the electronic device comprising a speaker and/or a microphone. The electronic device may be a speakerphone. The present invention relates in more detail to broadcasting encrypted audio to a hearing device.

BACKGROUND

Communicating with numerous people in a meeting can be a challenge for users of hearing devices, such as e.g. hearing aids, headphones, earbuds, etc.

Particularly in meeting rooms when sound is provided via one speaker, such as via a speakerphone, including conferencing speakers etc., meeting attendees are often positioned at a distance from the speakerphone. In such a setting, it can be a challenge for e.g. hearing-impaired persons using a hearing aid, to hear the audio from the speakerphone due to room reverb, which is also known from other settings, such as churches, cinemas, etc. where a telecoil can be used as a remedy.

SUMMARY

It is an object of the present invention to improve communication with hearing devices.

It is a further object of the present invention to improve security with communicating with hearing devices.

According to one aspect of the present invention, an electronic device configured for facilitating call communication with at least one hearing device, is provided. The electronic device comprises a first interface for interconnecting with a call communication software, e.g. via a call protocol, and an interacting unit configured for interacting with the hearing device. The interacting unit is configured for obtaining an audio encryption key and transmitting/presenting the audio encryption key to the hearing device. The electronic device further comprises a transmission unit configured for broadcasting encrypted audio during a call facilitated by the call communication software, the audio being encrypted using the audio encryption key. The audio encryption key may be configured to be valid for a duration of the call.

According to another aspect of the present invention, a method of broadcasting encrypted audio from an electronic device configured for facilitating call communication with at least one hearing device is provided. The method comprises interconnecting a first interface of the electronic device with a call communication software, such as via a call protocol. The method further comprises, in an interacting unit configured for interacting with the at least one hearing device, obtaining an audio encryption key, and transmitting/presenting the audio encryption key to the at least one hearing device. The method further comprises broadcasting encrypted audio during a call facilitated by the call communication software, the audio being encrypted using the audio encryption key. The audio encryption key may be configured to be valid for a duration of the call. The encrypted audio may be broadcast or transmitted to the at least one hearing device having received the audio encryption key from the electronic device.

In a further aspect of the present invention, a hearing device is provided, the hearing device being configured to be used with an electronic device as herein disclosed. The hearing device is configured to receive broadcast audio encrypted via an audio encryption key, the hearing device being configured to receive the audio encryption key from the interacting unit of the electronic device, the hearing device being further configured to decrypt received broadcast audio, and present the decrypted received broadcast audio to a user of the hearing device, wherein the audio encryption key is configured to be valid for a duration of a call.

In a further aspect of the present invention, a hearing device is provided, the hearing device being configured to be used with an electronic device as herein disclosed. The hearing device is configured to advertise that it is interested in receiving an audio encryption key, wherein the electronic device is configured to scan for the hearing device advertisement, and wherein pairing between the electronic device and the at least one hearing device is initiated and a connection completed upon a first user action. In some embodiments, the hearing device is configured to acknowledge the connection by providing a feedback to a user.

In some embodiments, the hearing device may be configured to receive the audio encryption key upon receiving a first user input at the electronic device. The first user input may, e.g., be tapping the electronic device. Upon receiving the first user input, the electronic device may transmit the audio encryption key to the hearing device. The hearing device may then receive the audio encryption key. In this way, the hearing device may not need to be paired with the electronic device.

In some embodiments, the hearing device may be configured to receive the audio encryption key via the paired connection upon receiving a second user input at the electronic device. The hearing device is configured to maintain the audio encryption key for a duration of the call.

It is an advantage of the method, electronic device and hearing device according to the present disclosure that audio may be broadcast or transmitted from the electronic device to at least one hearing device in a secure manner.

It is a further advantage that a plurality of hearing devices can receive same encrypted audio, such as a same encrypted audio stream, broadcast or transmitted by the electronic device, in that the audio encryption key can sequentially be transmitted/presented to the plurality of hearing devices. In some embodiments, the same audio encryption key is provided to any additional hearing devices interacting with the electronic device during a call. In some embodiments, audio, such as encrypted audio, may be broadcast. Broadcasting may be the distribution of audio, such as of audio and/or video content, to an audience in a one-to-many model. Thus, audio, such as encrypted audio, may be transmitted to a plurality of users using radio waves, such as using a wireless protocol, such as Bluetooth LE Audio. In some embodiments encrypted audio may be broadcast from the electronic device, e.g. via the transmission unit, using Bluetooth LE Audio without requiring pairing between the electronic device and the at least one hearing device.

The electronic device is configured for facilitating call communication with at least one hearing device. In some embodiments, the electronic device is configured for facilitating call communication with a plurality of hearing devices, such as with at least two hearing devices, such as with at least three hearing devices. In some embodiments, the electronic device is configured for facilitating call communication with a plurality of hearing devices, such as with at least two hearing devices, such as with at least three hearing devices during a same call.

In some embodiments, the at least one hearing device is configured to receive the audio encryption key only upon receiving a second user input at the electronic device. In some embodiments, the electronic device is configured to transmit the audio encryption key only upon receiving a second user input at the electronic device. In that a second user input at the electronic device is requested a further layer of security is added, e.g. a second user input, in addition to e.g. a user input initiating pairing of the electronic device and the hearing device. By providing a second user input at the electronic device, a further layer of security is added in that only hearing devices, or hearing device users, present at or in the vicinity, such as the immediate vicinity, of the electronic device can confirm and/or approve the transmission of the audio encryption key.

In some embodiments, the electronic device comprises at least one speaker. In some embodiments, the electronic device comprises at least one speaker and one or more microphones. In some embodiments, the electronic device additionally comprises one or more cameras, e.g. for capturing video. In some embodiments, the electronic device is a separately provided speaker, such as a speakerphone including a plug- and play speakerphone, a portable speakerphone, a wired or wireless speakerphone, etc. In some embodiments, the electronic device is a speakerphone comprising at least one speaker and one or more microphones.

The at least one hearing device may be a hearing device configured to assist a hearing impaired person with hearing audio from the surroundings, such as a hearing aid. The at least one hearing device may be a hearing device such as a headset, a headphone, earbuds, such as a hearing protectors, such as hearing protectors including ear muffs, ear plugs, etc. The at least one hearing device may comprise a communication unit configured for receiving the audio encryption key, such as a wireless communication unit. In some embodiments, the wireless communication unit comprises a Near Field Communication (NFC) unit, a Bluetooth unit, or any other wireless communication unit configured to receive the audio encryption key. In some embodiments, the hearing device communication unit can both receive the audio encryption key and the broadcast encrypted audio. In some embodiments, the hearing device comprises a communication unit configured to receive the audio encryption key, and another communication unit configured to receive the broadcast encrypted audio.

It is an advantage of the present invention that also e.g. hearing device users, such as hearing aid users, can attend meetings and receive audio irrespective of any room reverb or any distance from the electronic device, such as any distance from a speakerphone, in that audio is transmitted or broadcast directly to the hearing device or hearing aid, while at the same time transmitting an audible sound for meeting attendies with normal hearing. It is a further advantage that hearing device users can receive encrypted audio from the electronic device, also e.g. in noisy environments.

In some embodiments, the electronic device is configured for two-way communication. In some embodiments, the electronic device comprises a microphone. In some embodiments, the electronic device is a speakerphone and the speakerphone may comprise a microphone. The users of the electronic device, such as e.g. meeting attendies, may thereby be enabled to participate in the meeting by generating speech which can then be transmitted to far-end attendies via the electronic device, such as via the speakerphone. In this way, a number of devices used for a call communication is reduced, as the electronic device, such as a speakerphone, may provide several functionalities to facilitate the call communication.

In some embodiments, the electronic device is configured for interconnecting with a call communication software, and further configured for interconnecting with the hearing device.

The electronic device comprises a first interface for interconnecting with a call communication software, e.g. via a call protocol. The first interface may be configured for wired communication or wireless communication with the call communication software. The first interface may be any interface, such as any proprietary interface, such as a wired or wireless interface. In some embodiments, the interface is a USB interface, such as a USB C interface. In some embodiments, the interface is a wireless interface, such as a Wi-Fi interface, such as a Bluetooth interface, such as a Bluetooth Low Energy (LE) interface, such as a DECT interface, a digital interface, an analogue interface, etc. The interconnection may accordingly be configured via a call protocol, such as via a proprietary protocol, or such as via a Bluetooth protocol, a Bluetooth LE protocol, a DECT protocol, a USB protocol, etc.

The electronic device comprises an interacting unit configured for interacting with the hearing device. The interacting unit is configured for obtaining an audio encryption key, and transmitting/presenting the audio encryption key to the at least one hearing device. The interacting unit may include one or more of a display, one or more buttons, one or more proximity sensors, one or more NFC sensors, one or more LED indicators, a wireless communication unit or processor, such as a Bluetooth unit, such as a Bluetooth unit operating according to the Bluetooth protocol, such as according the Bluetooth LE protocol, such as a wireless communication unit operating according to any proprietary protocol in itself, or in addition to any of the standard protocols etc. In some embodiments, the interacting unit has a user interface comprising one or more of a display, one or more buttons, one or more proximity sensors, one or more NFC sensors, one or more LED indicators, etc. A wireless communication channel may be established between the electronic device and the hearing device, e.g. using NFC, Bluetooth, etc.

In some embodiments, the interacting unit is configured to establish a paired connection between the electronic device and the at least one hearing device to transmit the audio encryption key via the paired connection. The pairing between the electronic device and the at least one hearing device may be performed using a standard protocol such as the Bluetooth protocol, such as the Bluetooth LE protocol, or any proprietary protocol in itself, or in addition to any of the standard protocols. The pairing may be an Out-of-Band pairing, such as NFC assisted Out-of-Band pairing. In some embodiments, the term pairing includes the establishment of wireless communication channel or link between two devices, particularly the establishment of a secure wireless communication channel between two devices, such as via e.g. Bluetooth. Thus, upon pairing of the speakerphone with the at least first hearing device, a wireless communication channel or link is established between the speakerphone and the at least first hearing device over which the audio encryption key can be transmitted.

In some embodiments, the interacting unit is configured to transmit the audio encryption key to the hearing device via an NFC connection between the electronic device and the hearing device. It may be an advantage of using NFC to transmit the audio encryption key in that it is easy to interact with additional hearing devices. It may be an advantage of using NFC to transmit the audio encryption key in that no paired connection needs to be disconnected before additional hearing devices may be connected to the electronic device for transmission of the audio encryption key.

In some embodiments, the transmission or presentation of the audio encryption key is initiated at the electronic device, such as upon receiving one or more inputs, such as one or more user inputs via a user interface of the interacting unit. The user input may be a button press, such as at a physical button, such as at an electronically implemented button at a touch sensitive display, etc. The user input may be a proximity input, by e.g. bringing the hearing device, such as the hearing aid, or a hearing device charge case, into proximity of an NFC sensor.

In some embodiments, the electronic device is configured to transmit or present the audio encryption key in accordance with a determination that the at least one hearing device fulfils an initiation criterion, the initiation criterion including a physical presence criterion for the at least one hearing device. In some embodiments, the physical presence criterion may include a user input at the electronic device, such as a user input from a user of the hearing device, as this ensures that the hearing device is indeed present at the electronic device. Another presence criterion may include a visual readout, or an auditory readout of e.g. the audio encryption key.

It should be noted that the electronic device and the hearing device do not need to be paired in order to have the audio encryption key transmitted from one divide to the other.

It is an advantage of transmitting or presenting the audio encryption key in accordance with a determination that the at least one hearing device fulfils an initiation criterion, the initiation criterion including a physical presence criterion for the at least one hearing device. This may eliminate the possibility of eavesdropping, by e.g. a hearing device being outside of a room or a building in which the electronic device is present fraudulently connecting with the electronic device.

In some embodiments, the initiation criterion is fulfilled when a proximity is detected via NFC, and the audio encryption key may be transmitted via the NFC connection. It is an advantage of using NFC that a simple proximity of the hearing device to the electronic device may ensure proximity and transmission of the audio encryption key.

In some embodiments, the electronic device is configured to initiate pairing in accordance with a determination that the at least one hearing device fulfils an initiation criterion, the initiation criterion including a physical presence criterion for the at least one hearing device.

In some embodiments, the physical presence criterion may include a user input at the electronic device, such as a user input from a user of the hearing device, as this ensures that the hearing device is indeed present at the electronic device. Another presence criterion may include a visual readout, or an auditory readout of a pairing key.

It is an advantage of initiating pairing in accordance with a determination that the at least one hearing device fulfils an initiation criterion, the initiation criterion including a physical presence criterion for the at least one hearing device. This may eliminate the possibility of eavesdropping, by e.g. a hearing device being outside of a room or a building in which the electronic device is present fraudulently pairing with the electronic device.

The interacting unit is configured for obtaining an audio encryption key and transmitting/presenting the audio encryption key to the hearing device. In some embodiments, the interacting unit may present the audio encryption key via the user interface. In some embodiments, the audio encryption key may be a displayed audio encryption key to be received by the hearing device, either by direct input at the hearing device, or via e.g. a hearing device companion app. The audio encryption key may be any key including an alphanumerical key, a barcode, a QR code, etc. In some embodiments, the audio encryption key is a unique audio encryption key.

It is an advantage of having an audio encryption key in addition or alternative to any keys being exchanged during pairing of the electronic device and the at least one hearing device, as this ensures that the audio, such as the audio stream transmitted or broadcast from the electronic device, may be encrypted using the audio encryption key. This adds an additional security to the communication, and reduces the risk of eavesdropping on the communication. Particularly when the electronic device is using broadcasting for outputting audio, it is an advantage of having a simple way of communicating an audio encryption key to a hearing device, to enable secure communication between the electronic device and the hearing device.

In some embodiments, the audio encryption key may be transmitted to the hearing device, such as using a paired relationship between the electronic device and the hearing device. In some embodiments, the audio encryption key may be transmitted to the hearing device, e.g. via an NFC connection, such as via an audio encryption key readout, such as via presentation or display of the audio encryption key. The audio encryption key may be provided directly from the electronic device to the hearing device. The audio encryption key may be transmitted to the hearing device via a hearing device companion app. In some embodiments, a further user input, such as a further user initiated input, may be needed at the electronic device to facilitate the transmission of the audio encryption key to the hearing device. In some embodiments, the electronic device is configured to transmit the audio encryption key to the at least one hearing device via wireless communication, such as via an NFC connection, such as using a paired connection, etc.

In some embodiments, the electronic device comprises a Bluetooth processor or an NFC unit for wireless transmission of the audio encryption key between the electronic device and the at least one hearing device.

In some embodiments, the audio encryption key is provided or delivered to the hearing device via any protocol profile including any profile using UUIDs (universally unique identifiers), or GUIDs (global unique identifiers), including GATT, i.e. Generic Attribute Profile, used for Bluetooth, including GAP, i.e. General Access Profile, etc. The audio encryption key may be provided or delivered to the hearing device by a protocol over serial port profile, The audio encryption key may be provided or delivered to the hearing device directly via NFC.

The electronic device further comprises a transmission unit configured for broadcasting or transmitting encrypted audio during a call facilitated by the call communication software. The transmission unit may comprise any wireless communication unit configured for broadcasting of audio, thus the transmission unit may comprise a transmitter, a transmitter-receiver pair, such as a transceiver, a radio unit, a broadcasting unit, etc. The transmission unit may be configured for communication using any protocol as known for a person skilled in the art, including Bluetooth, including Bluetooth LE, Bluetooth Smart, Bluetooth LE Audio, etc., WLAN standards, manufacture specific protocols, such as tailored proximity antenna protocols, such as proprietary protocols, such as low-power wireless communication protocols, such as CSR mesh, etc., such as any combination thereof. In some embodiments, the transmission unit is configured for transmission or broadcast of audio only, without an option to receive audio.

In some embodiments, encrypted audio is broadcast from the electronic device to the at least one hearing device using a protocol such known for a person skilled in the art, including Bluetooth, including Bluetooth LE, Bluetooth Smart, Bluetooth LE Audio, etc., WLAN standards, manufacture specific protocols, such as tailored proximity antenna protocols, such as proprietary protocols, such as low-power wireless communication protocols, such as CSR mesh, etc. In some embodiments, the encrypted audio can be received by any appropriate receiver within range of the electronic device irrespective of a relationship between the electronic device and the hearing device. Particularly, in some embodiments, the encrypted audio can be received by any non-paired hearing devices within range of the broadcast. It is an advantage of being able to broadcast audio, while only hearing devices having received the audio encryption key may be able to decrypt the received audio.

In some embodiments, encrypted audio is broadcast from the electronic device to the at least one hearing device using a proprietary protocol, such as a proprietary protocol providing audio over Bluetooth LE.

In some embodiments, encrypted audio is broadcast via Bluetooth LE Audio.

In some embodiments, proprietary protocols are used for broadcasting encrypted audio from the electronic device to the at least one hearing device. In some embodiments, the encrypted audio is transmitted or broadcast using a protocol or standard which provides a high quality audio. In some embodiments, the encrypted audio is transmitted or broadcast so as to obtain low latency, and synchronization.

The encrypted audio broadcast from the electronic device to the hearing device is being encrypted using the audio encryption key. The audio is encrypted using any encryption standard as known in the art. In some embodiments, when broadcasting via a Bluetooth protocol, the encryption process may be performed by the Bluetooth processor, such as by a Bluetooth processor supporting Bluetooth LE Audio.

The audio encryption key may be configured to be valid for a duration of the call.

In some embodiments, the duration of the call, i.e. the length of the call, is determined by the electronic device, so that the call is determined to be initiated upon receiving a hook-off or start-of-call signal. The hook-off or start-of-call signal may be received from the call communication software via the call protocol. The hook-off or start-of-call signal may be received via an input at the electronic device. In some embodiments, the call is determined to be terminated upon receiving a hook-on or end-of-call signal, e.g. from the call communication software via the call protocol. Therefore, the duration of the call is determined by the start-of-call signal and the end-of-call call signal. Typically, the duration of a call is not predetermined. In some embodiments, the electronic device may communicate, to the hearing device, both the start-of-call signal and the end-of-call signal.

In some embodiments, the call is determined to be ongoing as long as there is a continuous audio flow to/from the electronic device. Thus, the duration of the call may be determined based on the presence of a continuous audio flow. In some embodiments, the start of a call may be determined by a hook-off or start-of-call signal, whereas the termination of the call may be determined when the continuous audio flow stops. The audio flow may be determined to be continuous if any interruptions, or breaks or pauses, in the audio flow are less than a threshold time, such as a threshold time of 1 s, 5 s, 10 s, such as 30 s, or such as 60 s.

In some embodiments, a session is established for each call being received, so that the session is ongoing for the duration of the call. In some embodiments, a session is a duration of a continuous audio flow to/from the electronic device.

In some embodiments, one audio encryption key is generated for each call, such that one single audio encryption key is generated for each call. The audio encryption key may be an audio encryption key generated for a particular call. The audio encryption key may be distributed to a plurality of users, including a plurality of hearing device users. Each of the plurality of hearing device users may be able to receive and decrypt broadcast encrypted audio using the audio encryption key.

In some embodiments, the audio encryption key is configured to be valid for a duration of a call or a session. The audio encryption key may be generated at the same time as when the start-of-call signal is generated. The audio encryption key may be terminated at the same time as when the end-of-call signal is generated. In this way, the validity of the audio encryption key is determined by start-of-call signals and end-of-call signals, thus the validity of the audio encryption key may be determined only by the start-of-call and end-of-call signals. The audio encryption key may be valid as long as the call is in progress. In other words, the validity of the audio encryption call is not predetermined. It is an advantage to determine the validity of the audio encryption key on a running basis, as typically it is not known how long a call may last, thus increasing flexibility. Even if it the call has a predetermined time duration, the call start and the call end may vary slightly.

In some embodiments, the audio encryption key has a predetermined validity, such as being a valid for a predetermined period of time, such for a period of time during which audio is received. In some embodiments, the audio encryption key is invalidated upon termination of the call. Thus, in some embodiments, the audio encryption key may be invalidated in accordance with a determination that the call has been terminated. In some embodiments, the audio encryption key is invalidated upon receiving a hook-on or end-of-call signal, e.g. from the call communication software via the call protocol. In some embodiments, the audio encryption key is invalidated by deleting the audio encryption key from a storage of the electronic device. In some embodiments, the audio encryption key is configured to encrypt a particular call, such as single call. In some embodiments, the audio encryption key is not configured to encrypt subsequent calls.

It is an advantage of a having an audio encryption key with a predetermined validity, or a limited validity, so that a new audio encryption key may be generated for each new call or each new session. The audio encryption key may be valid for one call or one session only. The audio encryption key may be a single-call or single-session audio encryption key.

The interacting unit is configured for obtaining an audio encryption key and transmitting/presenting the audio encryption key to the hearing device.

In some embodiments, the electronic device comprises a key generation unit configured to generate the audio encryption key. The key generation unit may be any key generator as known in the art, such as a random key generator, such as a random code generator, such as a pseudorandom key generator, such as a pseudorandom code generator, such as a QR code generator, etc. The interacting unit may be configured to obtain the audio encryption key from the key generation unit of the electronic device. For example, the QR code may be displayed at the electronic device, and may be read by a companion app of the hearing device, such as a companion app being configured to be run at a smart device, such as a smartphone or a smartwatch and being configured to communicate with the hearing device. The companion app may have access to a camera or another reader for reading the QR code The term "app" is used throughout this disclosure, and includes a software application, such as a software application configured to be run or executed at or via a smart device, such as a smartphone or a smartwatch.

In some embodiments, pairing of the hearing device with the electronic device triggers generation of the audio encryption key. In some embodiments, the audio encryption key is generated in response to a user input received at the electronic device. The audio encryption key may be generated upon receiving a request from a hearing device for the audio encryption key, The audio encryption key may be generated upon receiving a request from a hearing device for pairing between the electronic device and the hearing device.

In some embodiments, when an audio encryption key is generated for a call or a session and is transmitted or distributed to the at least one hearing device, the same audio encryption key is transmitted to any further hearing devices requesting an audio encryption key from the electronic device during a same call or a same session, such as via pairing of the devices, via NFC transmission, or via input of a request for receiving the audio encryption key. The audio encryption key may be valid for the duration of the call, or the duration of the session.

In some embodiments, pairing between the electronic device and the hearing device is enabled during a call or a session. In some embodiments, pairing between the electronic device and the hearing device is enabled both before and during a call or a session.

In some embodiments, the interacting unit obtains the audio encryption key from the call communication software via a first protocol. In some embodiments, the first protocol is different from the call protocol. In some embodiments, the first protocol is provided in addition to the call protocol. In some embodiments, the electronic device may receive the audio encryption key via the first protocol as part of a meeting invitation communication.

In some embodiments, the call communication software, such as a call communication software comprising a calendar software, generates an encryption key for a scheduled meeting, such as for a scheduled meeting using any call communication software including Microsoft Teams, Skype, Zoom, Viper, Google Meet, Cisco WebEx, BlueJeans, etc., as well as a regular telephone call. The call communication software may include video-conferencing options.

In some embodiments, the audio encryption key generated for a scheduled meeting is transmitted to the electronic device. In some embodiments, the audio encryption key is transmitted to the electronic device and/or to any hearing devices connected to the electronic device as disclosed herein, when the meeting starts. In some embodiments, the audio encryption key generated via the call communication software and transmitted to connected devices when the meeting starts, allows for decryption of the audio broadcast, such as of the encrypted audio, such as of the encrypted audio stream. In some embodiments, the audio encryption key is deleted from the connected devices upon ending of the meeting, such as upon end-of-call or end-of-session, such as upon receipt of end-of-call or end-of-session signals.

In some embodiments, the audio encryption key is stored in the electronic device, such as in a storage of the electronic device, such as in a storage of the interacting unit.

In an exemplary embodiment, the electronic device is a speakerphone and the at least one hearing device is a first hearing aid. The first hearing aid may be paired with the speakerphone, e.g. initiated via a physical presence indicator, e.g. in form of a button press, Pairing of the first hearing aid with the speakerphone triggers generation of a first audio encryption key. The first audio encryption key is transmitted to the first hearing aid being paired with the electronic device. A second hearing aid is subsequently or additionally paired with the speakerphone, during a same session or call. The pairing of the second hearing aid does not trigger the generation of a new audio encryption key. Rather, the speakerphone will transmit the first audio encryption key to the second hearing aid upon pairing of the second hearing aid. Both the first and the second hearing aid will receive the encrypted audio, the audio being encrypted using the first audio encryption key. In some embodiments, the pairing between the first hearing aid and the speakerphone is discontinued or disconnected after the audio encryption key has been transmitted to the hearing aid.

In some embodiments, the interacting unit is configured to enable pairing between the electronic device and the hearing device and the pairing is performed via a hearing device companion app or via a hearing device charge case.

In some embodiments, the interacting unit is configured to enable transmission of the audio encryption key via NFC; the hearing device and the interacting unit may be NFC enabled. In some embodiments, the interacting unit is configured to enable transmission of the audio encryption key via a pairing of the electronic device and the hearing device, e.g. via Bluetooth and an input at a physical button of the electronic device, or via a pairing profile of a hearing device companion app.

In some embodiments, the electronic device comprises an indicator, such as an LED, etc., the indicator being configured to show or indicate when encrypted audio is broadcast or transmitted.

In some embodiments, the hearing device is configured to receive encrypted audio via a wireless communication unit, such as via a wireless receiver, such as via a Bluetooth receiver, etc. In some embodiments, the hearing device additionally comprises a microphone for receiving an input sound signal and converting it into an audio signal. The audio signal may be provided to a processing unit for processing the audio signal and providing a processed output signal for the user of the hearing device. In some embodiments, also audio received via the wireless receiver is provided as input to the processing unit. An output transducer is connected to an output of the processing unit for converting the processed output signal into an output sound signal. The output transducer is often referred to as a receiver or speaker. The processing unit may comprise elements including one or more of the following elements: amplifiers, compressors, noise reduction systems, storage, etc. The wireless communication unit configured to receive audio, such as encrypted audio broadcast from the electronic device, may furthermore be configured for additional wireless communication with the electronic device, and/or for interconnection with other external devices, including hearing device accessories, other hearing devices, such as another hearing aid located in/on/at another ear of the user, typically in a binaural hearing system, external electronic devices, etc.

In some embodiment, the hearing device may be a hearing aid. The processing unit may be a processing unit configured to process a received audio signal so as to compensate a hearing loss of a user of the hearing device. The output sound signal may be a signal modified to compensate for a user's hearing impairment.

The hearing device may be any hearing device, the hearing device may be an in-the-ear hearing device and may be provided as an in-the-ear module. Alternatively, parts of the hearing device may be provided in a behind-the-ear module, while other parts, such as an output transducer, may be provided in an in-the-ear module.

In some embodiments, the hearing device is configured to share the audio encryption key with a counterpart hearing device, such as with another hearing device of a binaural hearing device.

The present invention relates to different aspects including the hearing device described above and in the following, and corresponding system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals may be used for identical or corresponding parts.

Figure 1A:
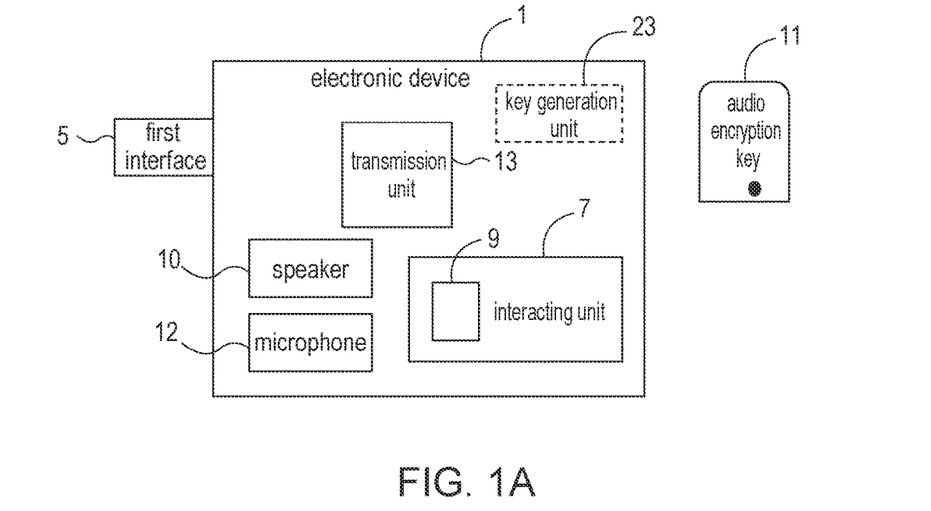
FIGS. 1a and 1b schematically illustrates an example of an electronic device according to the present disclosure, FIG. 2 schematically illustrates an example of a speakerphone according to the present disclosure.

FIG. 1a shows an electronic device 1 configured for facilitating call communication with at least one hearing device 3 (not shown in FIG. 1a), the electronic device 1 comprises a first interface 5 for interconnecting with a call communication software via a call protocol. The first interface 5 may be configured for wired or wireless communication with the call communication software. The first interface may be a USB interface, such as a USB C interface. The electronic device 1 further comprises an interacting unit 7 configured for interacting with the at least one hearing device 3. The interacting unit 7 is being configured for obtaining an audio encryption key 11, and for transmitting/presenting the audio encryption key 11 to the at least one hearing device 3. The electronic device 1 further comprises a transmission unit 13 configured for broadcasting encrypted audio during a call facilitated by the call communication software, the audio being encrypted using the audio encryption key 11. The transmission unit may comprise e.g. a Bluetooth processor. The audio encryption key 11 is configured to be valid for a duration of the call. In some embodiments, the audio encryption key may be provided to the at least one hearing device 3 over a wireless communication channel 31 between the at least one hearing device 3 and the electronic device 1, the wireless communication channel 31 being established upon pairing of the devices. The electronic device 1 may be a speakerphone. In some embodiments, the wireless communication channel 31 is an NFC connection, so that the audio encryption key may be provided to the at least one hearing device 3 via NFC. In some embodiments the audio encryption key may be provided via a visual or audible readout, etc.

The electronic device comprises optionally a key generation unit 23, and the interacting unit 7 is configured to obtain the audio encryption key 11 from the key generation unit 23. It is envisaged that alternatively, the interacting unit 7 may obtain the audio encryption key 11 from call communication software via a first protocol.

Typically, the electronic device 1 also comprises a speaker 10. The electronic device 1 typically also comprises a microphone 12. Typically, the electronic device 1 comprises at least one speaker 10 and at least one microphone 12.

Figure 1B:
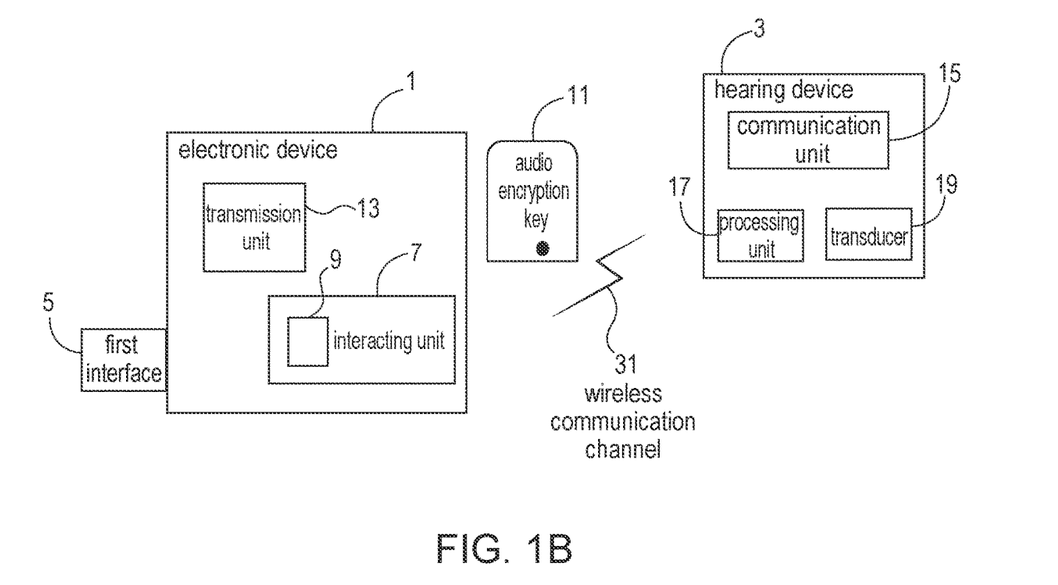

In FIG. 1b, the electronic device 1 and the hearing device 3 is shown. The electronic device 1 corresponds to the electronic device 1 of FIG. 1a. The hearing device 3 is shown, and it is seen that the hearing device 3 comprises a communication unit 15 configured to receive the audio encryption key. The hearing device further comprises a processing unit 17 configured to receive and optionally store the encrypted audio, to process and decrypt the encrypted audio, and to provide the processed and decrypted audio signal to a user of the hearing device 3, e.g. via transducer 19.

The audio encryption key 11 may be generated upon receiving a request from a hearing device 3 user, e.g. via an input at the electronic device, such as upon receiving a request for pairing between the electronic device 1 and the hearing device 3, either from a hearing device user, or from the hearing device itself.

Figure 2:
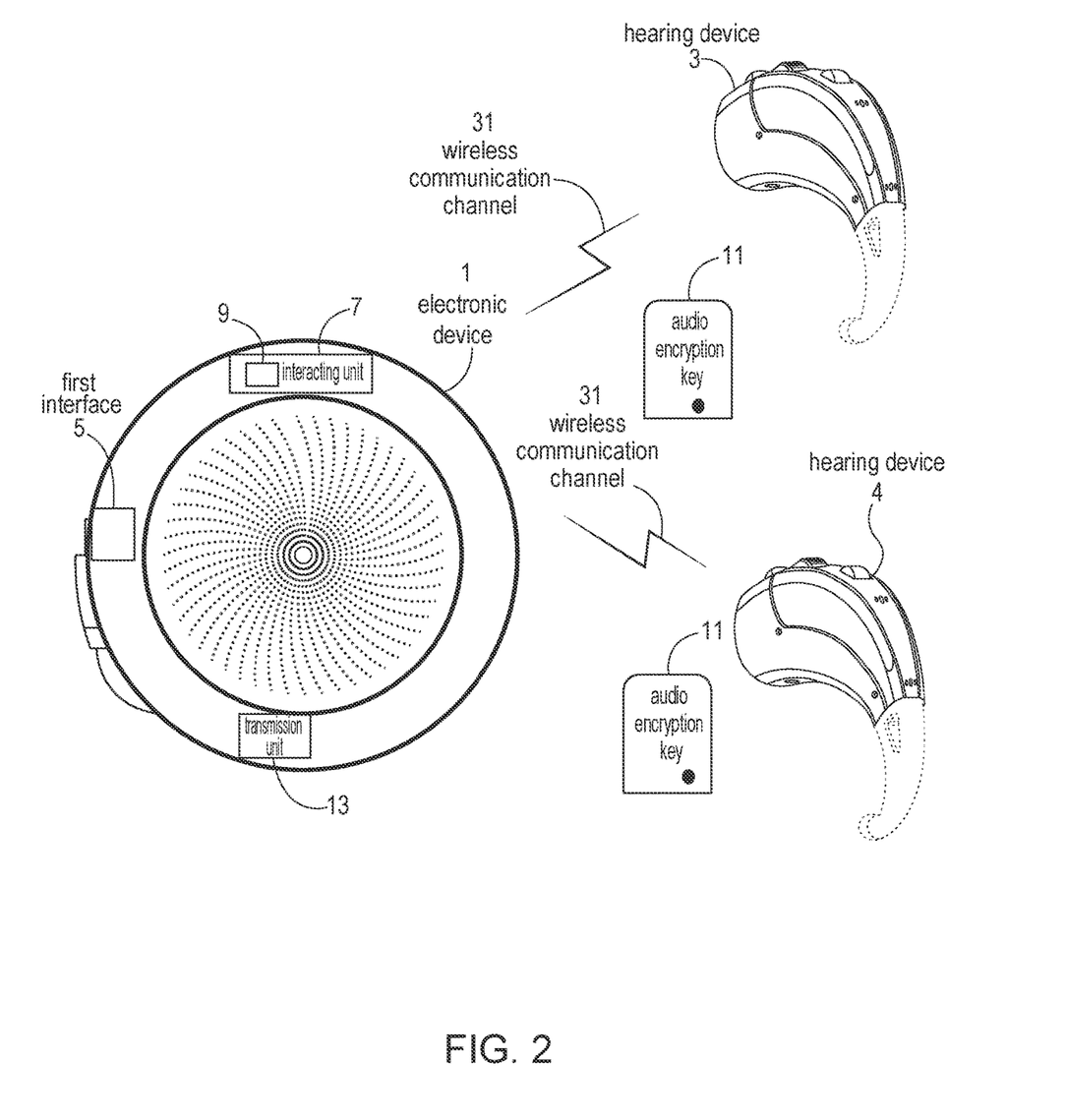

In FIG. 2 an exemplary embodiment of the disclosure is shown. The electronic device 1 is a speakerphone 1 and the at least one hearing device 3 is a first hearing aid 3. The first hearing aid 3 may obtain the audio encryption key from the speakerphone 1, e.g. via a paired connection, via NFC, etc.

The transmission of the audio encryption key may be initiated by bringing the hearing aid 3 into close proximity to the speakerphone, and particularly to the interacting unit 7 comprising user interface 9, to connect via NFC; the hearing aid 3 and the user interface being NFC enabled.

Alternatively, transmission of the audio encryption key may be performed via pairing of the electronic device and the hearing device. Pairing may be initiated by providing a user input to the electronic device via the user interface. Upon pairing of the first hearing aid 3 with the speakerphone 1, a first audio encryption key 11 is obtained by the interacting unit. In some examples, a generation of the first audio encryption key is triggered by the pairing. The first audio encryption key 11 is transmitted to the first hearing aid 3 being paired with the speakerphone 1. A second hearing aid 4 is additionally paired with the speakerphone 1, during a same session or call. The pairing of the second hearing aid 4 does not trigger the generation of a new audio encryption key. Rather, the speakerphone 1 will transmit the first audio encryption key 11 to the second hearing aid 4 upon pairing of the second hearing aid 4 with the speakerphone 1. Both the first hearing aid 3 and the second hearing aid 4 will receive the encrypted audio, the audio being encrypted using the first audio encryption key 11. The encrypted audio may be broadcast to the hearing aids 3, 4 over a wireless communication channel (not shown) different from the communication channel established when pairing the devices for transmission of the audio encryption key.

Figure 3:
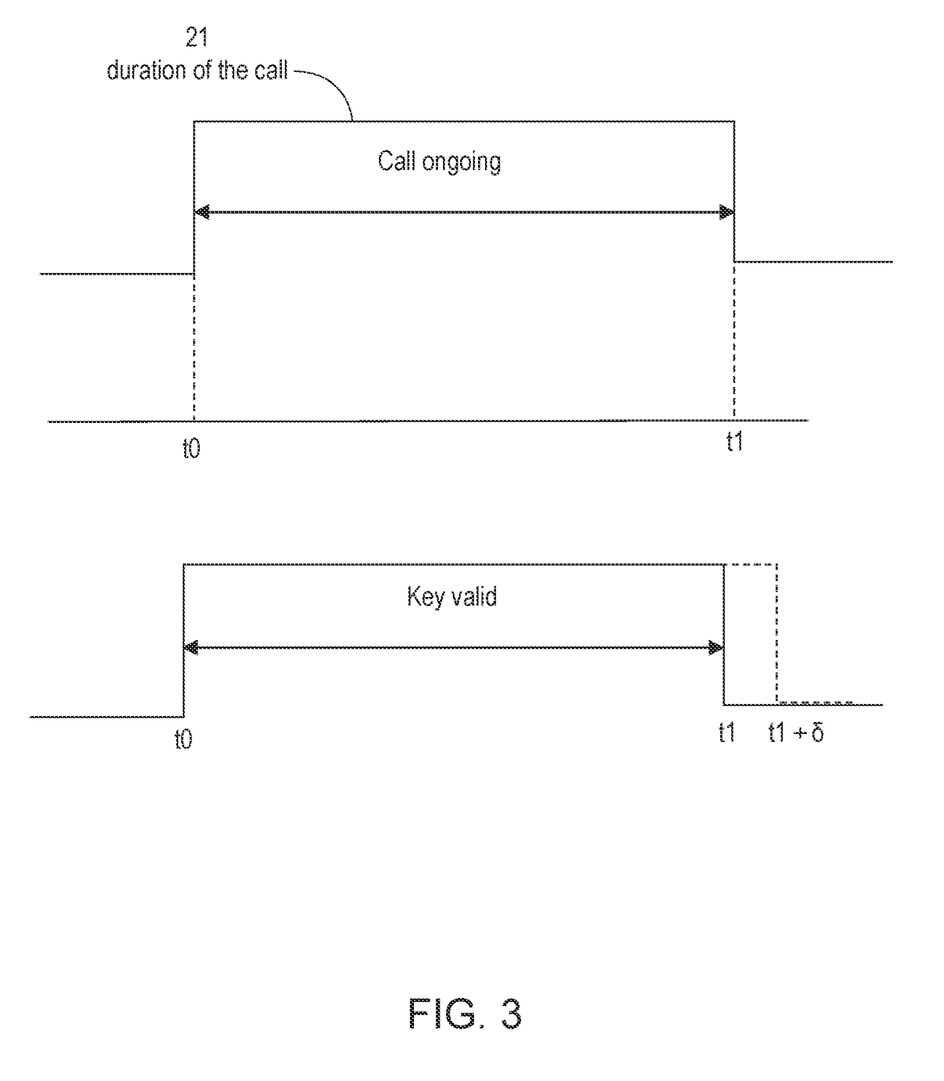
FIG. 3 illustrates a duration of a call.

FIG. 3 illustrates the duration of the call 21. The duration of the call 21 is determined by the electronic device, so that the call is determined to be initiated upon receiving a hook-off or start-of-call signal at time t0 and determined to be terminated upon receiving a hook-on or end-of-call signal at time t1.

One audio encryption key is generated for each call, and the audio encryption key is valid for the duration of the call 21, and is invalidated upon termination of the call at time t1. It is envisaged that for operational purposes, the key may be valid till a time t1+δ. The audio encryption key may be generated substantially at the same time when the start-of-call signal is generated. The audio encryption key may be invalidated substantially at the same time when the end-of-call signal is generated. It is an advantage to have the validity of the audio encryption key determined on ongoing basis, as the duration of the call is typically flexible, and not specific and predetermined.

It is envisaged that the call duration may also be determined as continuous, i.e. as ongoing when there is a continuous audio flow to/from the electronic device. In this respect, the key may be valid from a start of the continuous audio at e.g. t0 till the continuous audio is terminated at t1.

The electronic device 1 may be configured to transmit the audio encryption key in accordance with a determination that the at least one hearing device fulfils an initiation criterion, the initiation criterion including a physical presence criterion for the at least one hearing device.

The physical presence may be determined in various ways. In some exemplary embodiments, the audio encryption key 11 is distributed from electronic device 1 in one of the following ways ensuring physical presence:

Visual readout of the audio encryption key from a display on electronic device 1 via user interface 9
Auditory readout from speaker 10 of electronic device 1
NFC between electronic device 1 and hearing device 3
BLE (Bluetooth Low Energy) connection to hearing device combined with a physical presence test (button push) on electronic device, e.g. via user interface 9.
BLE (Bluetooth Low Energy) connection to companion app, e.g. on a smart device, such as a smartphone or a smart watch, combined with a physical presence test (button push) on the electronic device 1, e.g. via user interface 9.

Thus, the interacting unit configured to obtain an audio encryption key, and transmit/present the audio encryption key to the at least one hearing device, may be configured to transmit the audio encryption key to the hearing device. In some embodiments additionally a pairing between the electronic device and the hearing device may be performed. The pairing may be performed via NFC, via Bluetooth and an input at a physical button of the electronic device, or via a pairing profile of a hearing device companion app.

It is an advantage of pairing using either NFC or Bluetooth and an input at a physical button of the electronic device in that proximity of the hearing device, and or a user of the hearing device, is determined.

Figure 4:
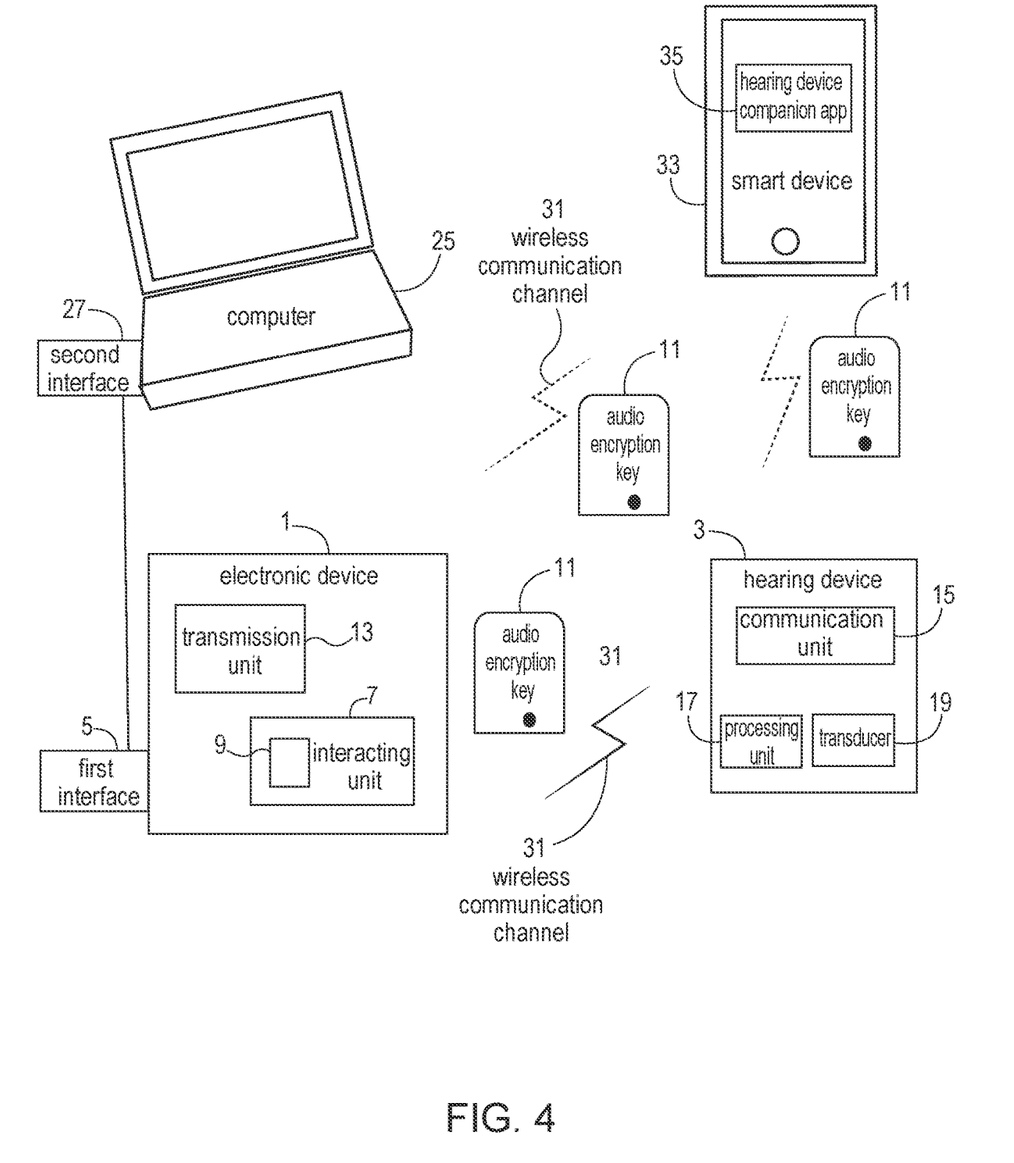
FIG. 4 illustrates an electronic device according to the present disclosure.

In FIG. 4, the electronic device 1, the hearing device 3 and a computer 25 is illustrated. In some embodiments, the call communication software is run via the computer 25, and the computer 25 has a second interface 27 corresponding to first interface 5 of the electronic device 1. The call communication software is connected to other users in any known manner, e.g. via the internet, a cloud service, etc. The call communication software as run on computer 25 is configured to interconnect to the first interface of the electronic device for interconnecting the electronic device 1 and the call communication software via a call protocol. The audio encryption key may be generated via the computer 25, for example by or via the call communication software. The audio encryption key may be generated as part of a meeting invitation communication. The electronic device may receive the audio encryption key via a first protocol, such as via a first protocol different from the call protocol The first protocol and call protocol may be communicated between first and second interfaces 5, 27. The communication may be wired or wireless.

In FIG. 4, it is seen that optionally, the interacting unit 7 configured to obtain the audio encryption key, and transmit/present the audio encryption key to the at least one hearing device may transmit the audio encryption key via a hearing device companion app 35, e.g. as installed at a smart device 33, such as a smartphone, or via a hearing device charge case (not shown).

Should more than one hearing device request an audio encryption key from the electronic device, the same audio encryption key is provided to any additional hearing devices requesting the audio encryption key from the electronic device during a call.

The electronic device may comprise an indicator, the indicator being configured to show when encrypted audio is being broadcast. The indicator may be an LED. The encrypted audio may be broadcast via Bluetooth Low Energy Audio.

The hearing device 3, as illustrated e.g. in FIG. 1b, is configured to be used with an electronic device as disclosed herein. The hearing device is configured to advertise that it is interested in receiving an audio encryption key, wherein the electronic device 1 is configured to scan for the hearing device advertisement, and wherein pairing between the electronic device 1 and the at least one hearing device 3 is initiated and a connection completed upon a first user action, e.g. at the electronic device 1. The hearing device is configured to acknowledge the connection by providing a feedback to a user, e.g. audible, tactile or visibly.

The hearing device is configured to receive the audio encryption key upon receiving a second user input at the electronic device. The hearing device is configured to maintain the audio encryption key for a duration of the call.

The hearing device 3 may be configured to receive broadcast audio encrypted via an audio encryption key 11, the hearing device 3 being configured to receive the audio encryption key 11 from the interacting unit 7 of the electronic device, the hearing device 3 being further configured to decrypt received broadcast audio, and present the decrypted received broadcast audio to a user of the hearing device 3, wherein the audio encryption key is configured to be valid for a duration of a call.

Figure 5:
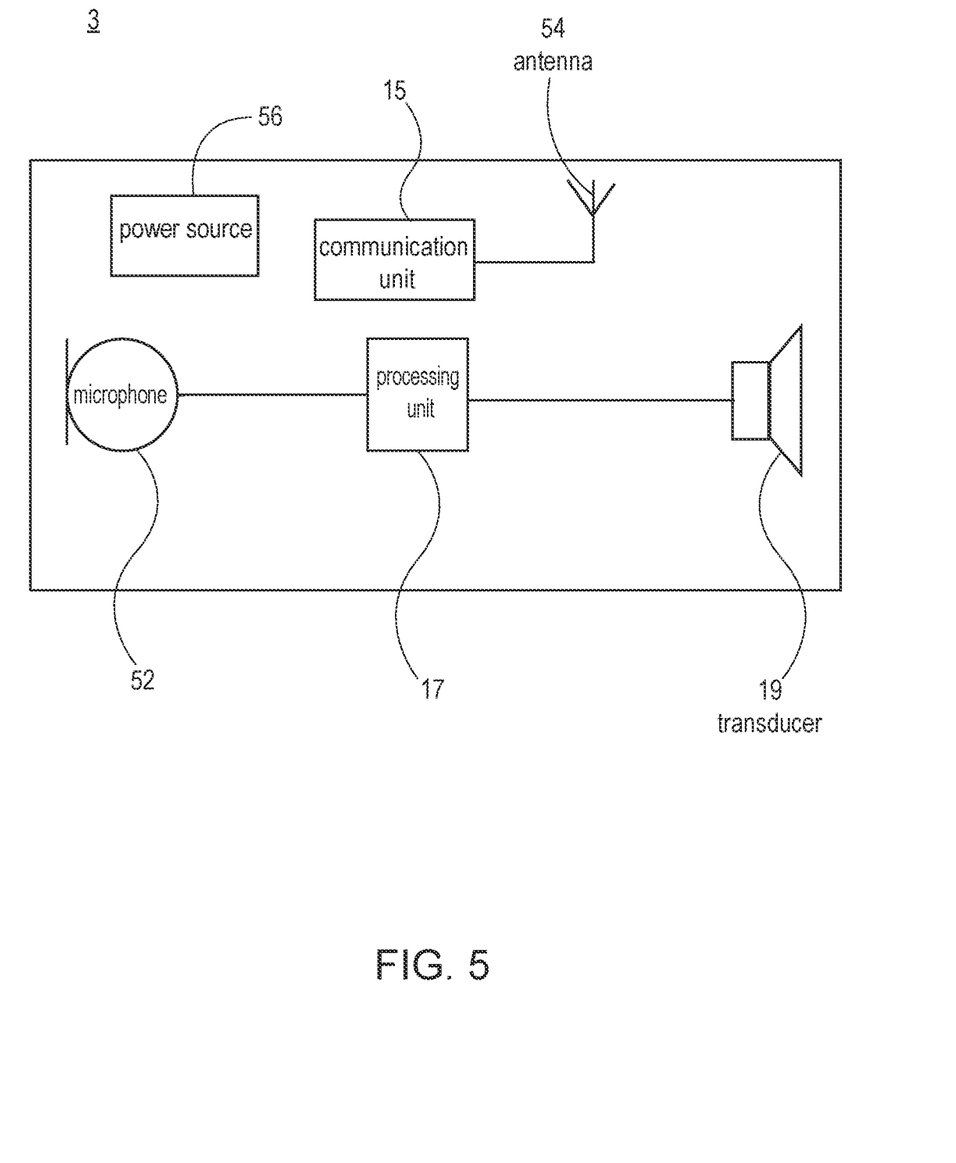
FIG. 5 shows schematically a hearing device.

FIG. 5 illustrates another exemplary hearing device 3 according to the present disclosure. The hearing device 3 comprises a microphone 52, for receiving an input sound signal and converting it into an audio signal. The audio signal is provided to a processing unit 17 for processing the audio signal and providing a processed output signal for the user of the hearing device 3. An output transducer 19 is connected to an output of the processing unit 17 for converting the processed output signal into an output sound signal. The output transducer 19 is often referred to as a receiver or speaker. The processing unit 17 may comprise elements including one or more of the following elements: amplifiers, compressors, noise reduction systems, storage, etc. The hearing device 3 may further comprise a wireless communication unit 15 including antenna 54 configured for wireless communication with electronic device 1, and/or for interconnection with other external devices, including hearing device accessories, other hearing devices, such as another hearing aid located in/on/at another ear of the user, typically in a binaural hearing system, external electronic devices, etc. The wireless communication unit 15, such as a radio or a transceiver, connects to the processing unit 17. The processing unit 17 may include a signal processor. The hearing device 3 further comprises a power source 56, such as a battery 56.

The hearing device 3 may be a hearing aid. The processing unit may be a processing unit configured to process a received audio signal so as to compensate a hearing loss of a user of the hearing device. The output sound signal may be a signal modified to compensate for a user's hearing impairment.

The hearing device 3 may be an in-the-ear hearing device and may be provided as an in-the-ear module. Alternatively, parts of the hearing device 3 may be provided in a behind-the-ear module, while other parts, such as the output transducer 19, may be provided in an in-the-ear module.

The hearing device 3 may be configured to share the audio encryption key with a counterpart hearing device, such as with another hearing aid located in/on/at another ear of the user, typically in a binaural hearing system.

Figure 6:
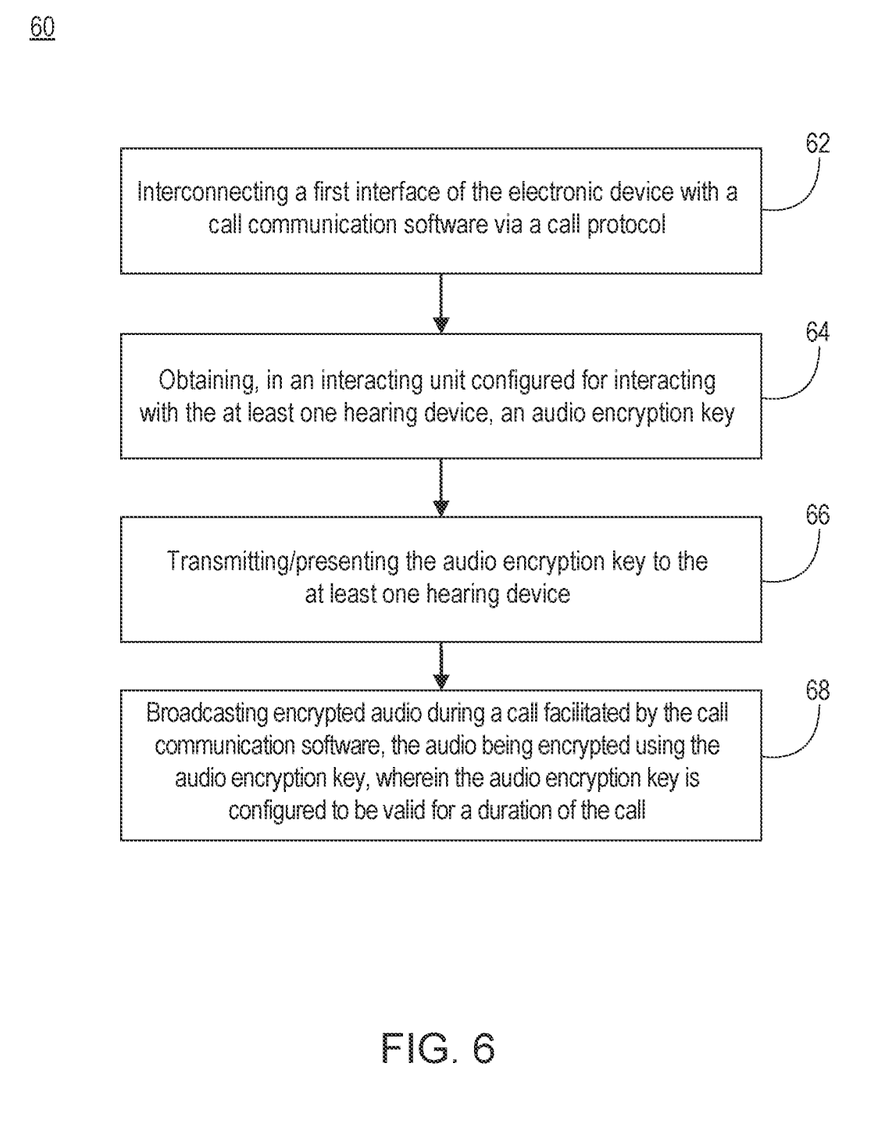
FIG. 6 is a flowchart of a method according to the present invention.

FIG. 6 shows a method 60 of broadcasting encrypted audio from an electronic device 1 configured for facilitating call communication with at least one hearing device 3. The method comprises at step 62, interconnecting a first interface of the electronic device with a call communication software via a call protocol; in step 64, obtaining, in an interacting unit configured for interacting with the at least one hearing device, an audio encryption key; and in step 66 transmitting/presenting the audio encryption key to the at least one hearing device. The method further comprises, in step 68, broadcasting encrypted audio during a call facilitated by the call communication software, the audio being encrypted using the audio encryption key, wherein the audio encryption key is configured to be valid for a duration of the call.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 1 electronic device
3, 4 hearing device
5 first interface
7 interacting unit
10 speaker
11 audio encryption key
12 microphone
13 transmission unit
15 communication unit
17 processing unit
19 transducer
21 duration of the call
23 key generation unit
25 computer
27 second interface
31 wireless communication channel
33 smart device
35 hearing device companion app
52 microphone
54 antenna
56 power source

The invention claimed is:

1. An electronic device configured for facilitating call communication with at least one hearing device, the electronic device comprising:
a first interface for interconnecting with a call communication software via a call protocol,
an interacting unit configured for interacting with the at least one hearing device, the interacting unit being configured for:
obtaining an audio encryption key and
transmitting/presenting the audio encryption key to the at least one hearing device, wherein the duration of the call is determined by the electronic device;
wherein the electronic device further comprises a transmission unit configured for broadcasting encrypted audio during a call facilitated by the call communication software, the audio being encrypted using the audio encryption key, and wherein the audio encryption key is configured to be valid for a duration of the call.

2. An electronic device according to claim 1, wherein the call is determined to be initiated upon receiving a hook-off or start-of-call signal and determined to be terminated upon receiving a hook-on or end-of-call signal.

3. An electronic device according to claim 1, wherein one audio encryption key is generated for each call.

4. An electronic device according to claim 1, wherein the audio encryption key is invalidated upon termination of the call.

5. An electronic device according to claim 1, wherein the electronic device comprises a key generation unit, and wherein the interacting unit is configured to obtain the audio encryption key from the key generation unit.

6. An electronic device configured for facilitating call communication with at least one hearing device, the electronic device comprising:
a first interface for interconnecting with a call communication software via a call protocol,
an interacting unit configured for interacting with the at least one hearing device, the interacting unit being configured for:

obtaining an audio encryption key and transmitting/presenting the audio encryption key to the at least one hearing device, wherein the electronic device further comprises a transmission unit configured for broadcasting encrypted audio during a call facilitated by the call communication software, the audio being encrypted using the audio encryption key, and wherein the audio encryption key is configured to be valid for a duration of the call; and wherein the interacting unit obtains the audio encryption key from the call communication software via a first protocol.

7. An electronic device configured for facilitating call communication with at least one hearing device, the electronic device comprising:

a first interface for interconnecting with a call communication software via a call protocol, an interacting unit configured for interacting with the at least one hearing device, the interacting unit being configured for:

obtaining an audio encryption key and transmitting/presenting the audio encryption key to the at least one hearing device wherein the electronic device further comprises a transmission unit configured for broadcasting encrypted audio during a call facilitated by the call communication software, the audio being encrypted using the audio encryption key, and wherein the audio encryption key is configured to be valid for a duration of the call; and wherein the electronic device receives the audio encryption key via a first protocol as part of a meeting invitation communication.

8. An electronic device according to claim 1, wherein the electronic device is configured to initiate a pairing in accordance with a determination that the at least one hearing device fulfils an initiation criterion, the initiation criterion including a physical presence criterion for the at least one hearing device.

9. An electronic device according to claim 1, wherein the audio encryption key is generated upon receiving a request from a hearing device for pairing between the electronic device and the hearing device.

10. An electronic device according to claim 1, wherein the interacting unit is configured to transmit/present the audio encryption key to the at least one hearing device, via a hearing device companion app or via a hearing device charge case.

11. An electronic device according to claim 1, wherein the same audio encryption key is provided to any additional hearing devices interacting with the electronic device during a call.

12. An electronic device according to claim 1, wherein the encrypted audio is broadcast via Bluetooth Low Energy Audio.

13. A method of broadcasting encrypted audio from an electronic device configured for facilitating call communication with at least one hearing device, the method comprising:

interconnecting a first interface of the electronic device with a call communication software via a call protocol, in an interacting unit configured for interacting with the at least one hearing device:

obtaining an audio encryption key and transmitting/presenting the audio encryption key to the at least one hearing device, wherein the method further comprises broadcasting encrypted audio during a call facilitated by the call communication software, the audio being encrypted using the audio encryption key, and wherein the audio encryption key is configured to be valid for a duration of the call and wherein the duration of the call is determined by the electronic device.

14. A hearing device for use with an electronic device according to claim 1, wherein the hearing device is configured to receive broadcast audio encrypted via an audio encryption key, the hearing device being configured to receive the audio encryption key from the interacting unit of the electronic device, the hearing device being further configured to decrypt received broadcast audio, and present the decrypted received broadcast audio to a user of the hearing device, wherein the audio encryption key is configured to be valid for a duration of a call.

15. A hearing device according to claim 14, wherein the hearing device is configured to share the audio encryption key with a counterpart hearing device.

* * * * *